(12) United States Patent
Danielescu et al.

(10) Patent No.: US 10,360,909 B2
(45) Date of Patent: Jul. 23, 2019

(54) NATURAL MACHINE CONVERSING METHOD AND APPARATUS

(71) Applicant: Intel Corporation, Santa Clara, CA (US)

(72) Inventors: Lavinia A. Danielescu, Santa Clara, CA (US); Shawn C. Nikkila, San Jose, CA (US); Robert J. Firby, Santa Clara, CA (US); Beth Ann Hockey, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 4 days.

(21) Appl. No.: 15/661,991

(22) Filed: Jul. 27, 2017

(65) Prior Publication Data

US 2019/0035391 A1      Jan. 31, 2019

(51) Int. Cl.
*G10L 15/22*      (2006.01)
*G10L 15/18*      (2013.01)
*G10L 15/02*      (2006.01)
*G10L 15/32*      (2013.01)
G10L 15/08        (2006.01)
G10L 25/90        (2013.01)

(52) U.S. Cl.
CPC .............. *G10L 15/22* (2013.01); *G10L 15/02* (2013.01); *G10L 15/18* (2013.01); *G10L 15/32* (2013.01); *G10L 25/90* (2013.01); *G10L 2015/088* (2013.01); *G10L 2015/223* (2013.01)

(58) Field of Classification Search
CPC ....... G06F 1/3203; G10L 15/22; G10L 15/20; G10L 2015/223; G10L 15/26
See application file for complete search history.

(56) References Cited

U.S. PATENT DOCUMENTS

| | | | |
|---|---|---|---|
| 7,240,011 B2 | 7/2007 | Horvitz | |
| 9,043,211 B2 | 5/2015 | Haiut et al. | |
| 9,245,527 B2 | 1/2016 | Lindahl | |
| 9,361,885 B2 | 6/2016 | Ganong, III et al. | |
| 2010/0286490 A1* | 11/2010 | Koverzin | G06F 19/3418 600/301 |
| 2011/0060588 A1 | 3/2011 | Weinberg | |
| 2014/0163978 A1 | 6/2014 | Basye et al. | |
| 2014/0214429 A1* | 7/2014 | Pantel | G10L 21/16 704/275 |
| 2016/0148615 A1 | 5/2016 | Lee et al. | |
| 2016/0155443 A1* | 6/2016 | Khan | G06F 1/3203 704/275 |
| 2017/0069316 A1* | 3/2017 | Makino | G10L 15/22 |
| 2017/0345425 A1* | 11/2017 | Ikeno | G06F 3/013 |
| 2018/0143967 A1* | 5/2018 | Anbazhagan | G06F 8/30 |

* cited by examiner

*Primary Examiner* — Richemond Dorvil
*Assistant Examiner* — Mark Villena
(74) *Attorney, Agent, or Firm* — Schwabe, Williamson & Wyatt, P.C.

(57) ABSTRACT

Apparatuses, methods and storage medium associated with a spoken dialog system are disclosed herein. In embodiments, an apparatus for natural machine conversing with a user may comprise a listening component to detect a keyword that denotes start of a conversation; a dialog engine to converse with the user during the conversation; and a controller to selectively activate or cause to be activated one of the listening component or the dialog component, and to pass control to the activated listening component or the activated dialog engine, based at least in part on a state of the conversation. Other embodiments may be disclosed or claimed.

25 Claims, 6 Drawing Sheets

NATURAL MACHINE CONVERSING METHOD AND APPARATUS

TECHNICAL FIELD

The present disclosure relates to the fields of computing, machine conversation, and artificial intelligence; and in particular, to apparatuses and methods associated with natural machine conversing with a user.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

With advances in integrated circuits, computing, artificial intelligence, speech recognition, and other related technologies, spoken dialogue systems have become increasingly popular. Examples of spoken dialogue systems include, but are not limited to Siri from Apple Computer, Google Home from Google, Echo from Amazon, Cortana from Microsoft, and so forth. For portability, many of today's spoken dialogue systems are powered by battery. To preserve battery life, typically a Low Power Always Listening (LPAL) component with a magic word strategy is employed. The LPAL component runs a very low power automatic speech recognition (ASR) engine that recognizes and responds to only one "magic" word or phrase. On recognition of the "magic" word or phrase, the LPAL, activates a much more capable ASR component embedded in the spoken dialogue engine to recognize user utterances, and respond to the user utterances. The more capable ASR component during operation consumes more power than the LPAL component, thus is shut down after each response to a user utterance. As a result, the users in this type of system must use this magic word/phrase before every utterance they make to the system.

However, in cooperative natural conversation, participants give each other opportunities to interject or take over the turn, and participants do not need to call out each other's names every time they talk to make sure the other person is listening. Thus, today's spoken dialogue systems with LPAL and magic word strategy are unnatural, and annoying to many users. A solution to support more natural machine conversation interactions with a user, while preserving battery is needed.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Apparatuses, methods and storage medium associated with a spoken dialogue system are disclosed herein. In embodiments, an apparatus for natural machine conversing with a user may comprise a listening component to detect a keyword that denotes start of a conversation; a dialogue engine to converse with the user during the conversation; and a controller coupled to the listening component and the dialogue engine to selectively activate or cause to be activated one of the listening component or the dialogue component, and to pass control to the activated listening component or the activated dialogue engine, based at least in part on a state of the conversation. The other of the listening component and the dialogue engine is deactivated or cause to be deactivated, when one of the listening component and the dialogue engine is activated or cause to be activated.

In embodiments, a machine implemented method for natural conversing with a user may comprise setting, by a dialogue engine of a computer device, a timer of the dialogue engine, on activation of the dialogue engine; on setting the timer, conversing, by the dialogue engine, with a user of the computer device; and on expiration of the timer, notifying a controller of the computer device, by the dialogue engine, of the expiration of the timer. In response to the expiration of the timer, the controller may activate or cause to be activated a listening component, and deactivate or cause to be deactivated the dialogue engine.

These and other aspects will be further described below with references to the Figures. As will be appreciated by those skilled in the art, from the descriptions to follow, the spoken dialogue system of the present disclosure for machine conversing with a user may be better in mimicking human-human behavior by using magic word/phrase only at times when humans would expect to need to attract the attention of their conversational partner—beginnings of conversations and resuming conversation after a conversation stops and there is some period of conversational inactivity (but not prior to each interaction). As a result, more natural and better user experience may be achieved.

In the description to follow, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Operations of various methods may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiments. Various additional operations may be performed and/or described operations may be omitted, split or combined in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used hereinafter, including the claims, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs generated from a plurality of programming instructions, a combinational logic circuit, and/or other suitable components that provide the described functionality.

Figure 1:
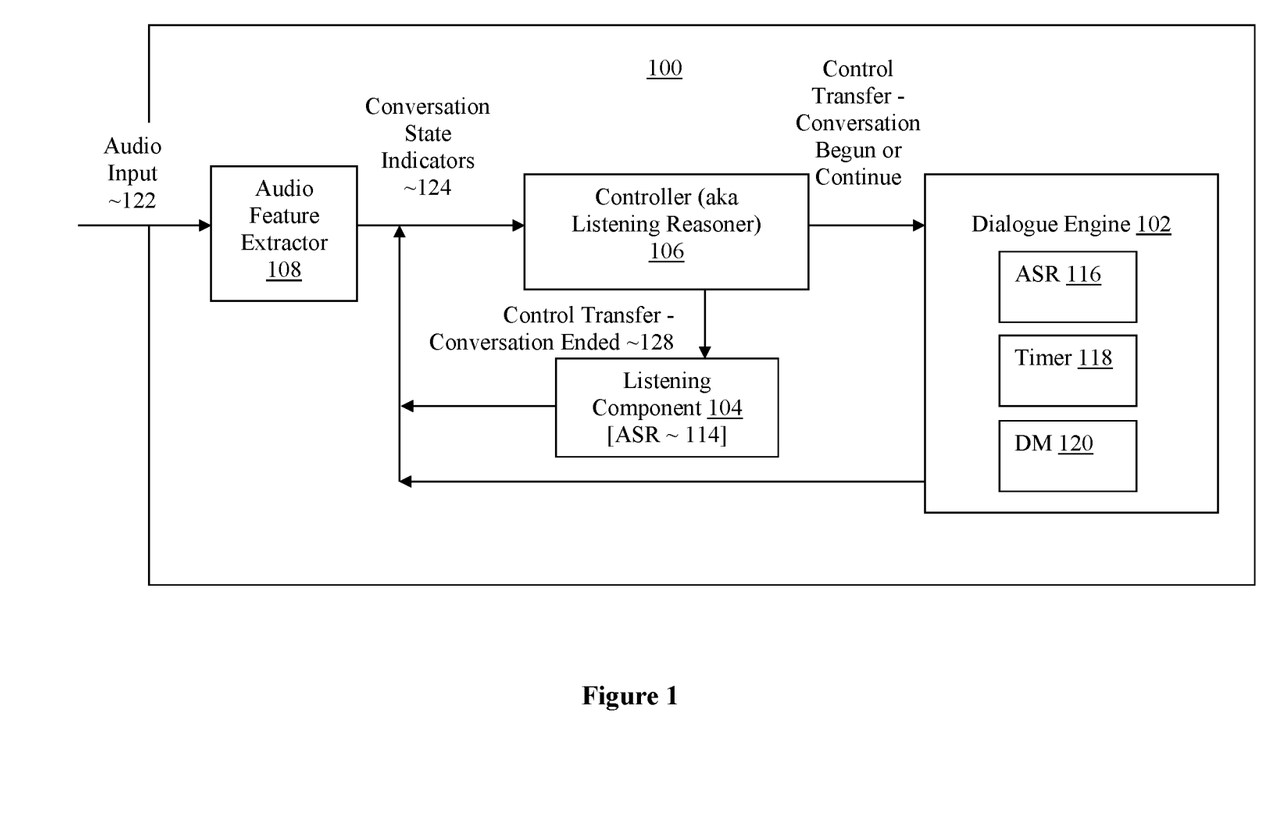
FIG. 1 is a simplified block diagram of the spoken dialogue system of the present disclosure, in accordance with various embodiments.

Referring now FIG. 1, wherein a simplified block diagram illustrating components of the spoken dialogue system of the present disclosure, in accordance with various embodiments, is shown. As illustrated, spoken dialogue system 100 may include dialogue engine 102, listening component 104, controller (also referred to as listening reasoner) 106, and audio feature extractor 108, coupled with each other as shown.

Dialogue engine 102 may be configured to converse with a user, with the ability to understand utterances of the user, and audibly respond to the user utterances. Listening component 104, on the other hand, may be configured to listen for and understand one or more (limited number of) keywords or phrases (also referred to as magic words or phrases) that denote beginning or start of a conversation. Thus, circuitry or logic implementing dialogue engine 102 is more complex or sophisticated, when compared to listening component 104, and therefore, during operation, tends to consume more power than listening component 104.

Controller (also referred to as listening reasoner) 102 may be configured to selectively activate/cause to be activated, or deactivate/cause to be deactivated dialogue engine 102 and listening component 104, based at least in part on a state of a conversation with a user. More specifically, controller 102 may be configured to activate/cause to be activated dialogue engine 102 at the beginning or start of a conversation, and keep dialogue engine 102 activated until the end of the conversation, and thereafter keep the dialogue engine 102 de-activated. Concurrently, controller 102 may be configured to activate/cause to be activated listening component 104 at the end of a conversation, and keep listening component 104 activated until the start of another conversation, and on commencement of a new conversation, keep the listening component 104 de-activated.

Accordingly, spoken dialogue system 100 for machine conversing with a user may be better in mimicking human-human behavior by using magic word/phrase only at times when humans would expect to need to attract the attention of their conversational partner—beginnings of conversations and resuming conversation after a conversation stops and there is some period of conversational inactivity. As a result, more natural and better user experience may be achieved.

In embodiments, controller 102 may be configured to reason and assess the state of a conversation, beginning, continuing or end, based at least in part on conversation state indicators 124. Conversation state indicators 124 may include audio features extracted from audio input 122 of a user wanting to engage or engaging in a conversation with spoken dialogue engine 100. Examples of audio features may include, but are not limited to, the pitch, amplitude, speed, and so forth, of audio input 122. In embodiments, conversation state indicators 124 may include data or information provided by listening component 104 and dialogue engine 102. Examples of these data may include, but are not limited to indications from listening component 104 that a keyword/phrase has been recognized, or indications from dialogue engine 102 that user utterances have been recognized, responses to user utterances being provided, and so forth.

Controller 102 may reason or infer the start of a conversation from a conversation state indicator 124 that denotes a keyword/phrase has been recognized. Controller 102 may further reason or infer the continuation of the conversation from the pitch, amplitude, speed, et al of audio input 122, or indicators that denote user utterances recognized or response to user utterances that tend to elicit further utterances from the user. Similarly, controller 102 may reason or infer the end of the conversation from the pitch, amplitude, speed, et al of audio input 122, or indicators that denote neither user utterances have been recognized or response to user utterances have been sent for some time (an extended quiet period), or user utterances or responses that tend to denote an end of the conversation (e.g., user utterance or response of "goodbye" or "good night" in response to system 100 or the user having made similar utterance.)

Audio feature extractor 108 may be configured to receive and process audio input 122 of a user wanting to engage or engaging in a conversation with spoken dialogue system 100. As alluded to earlier, audio feature extractor 108 may be configured to extract audio features from audio input 122, pitch, amplitude, speed, and so forth. On extraction, audio feature extractor 108 may provide these audio features of audio input 122 as conversation state indicators 124 to controller 102.

In embodiments, dialogue engine 102 may include asynchronous speech recognition (ASR) engine 116, timer 118, and dialogue management 120, to be described more fully below. Listening component 104 may include ASR engine 114, which in general may be less capable than ASR 116, but consumes substantially less power than ASR 116.

In embodiments, each of dialogue engine 102, listening component 104, controller 106, and audio feature extractor 108 may be implemented with application specific integrated circuits (ASIC), programmable circuits such as field programmable gate arrays (FPGA), or in software with instructions to be executed by a computer processor with one or more processor cores. In embodiments, except for timer 118, dialogue manager 120, and the cooperation between dialogue engine 102 and controller 106, dialogue engine 102 may be any one of a number of dialogue engines known in the art. Similarly, except for the cooperation with controller 106, listening component 104 may be any one of a number of low power consumption listening components known in the art, e.g., a LPAL component. Likewise, except for the cooperation with controller 106, audio feature extractor 108 may be any one of a number of audio feature extractors known in the art.

Before continuing with the remainder of the description, it should be noted that for ease of understanding, only data and control flows substantially related to the selective activation and deactivation of dialogue engine 102 and listening component 104 are shown. Spoken dialogue system 100 may include other components and/or other data/control flows. For example, spoken dialogue system 100 may include a battery (not shown) to provide power, and/or each of ASR 114 and 116 also receives audio input 122 to perform their speech recognition function.

Figure 2:
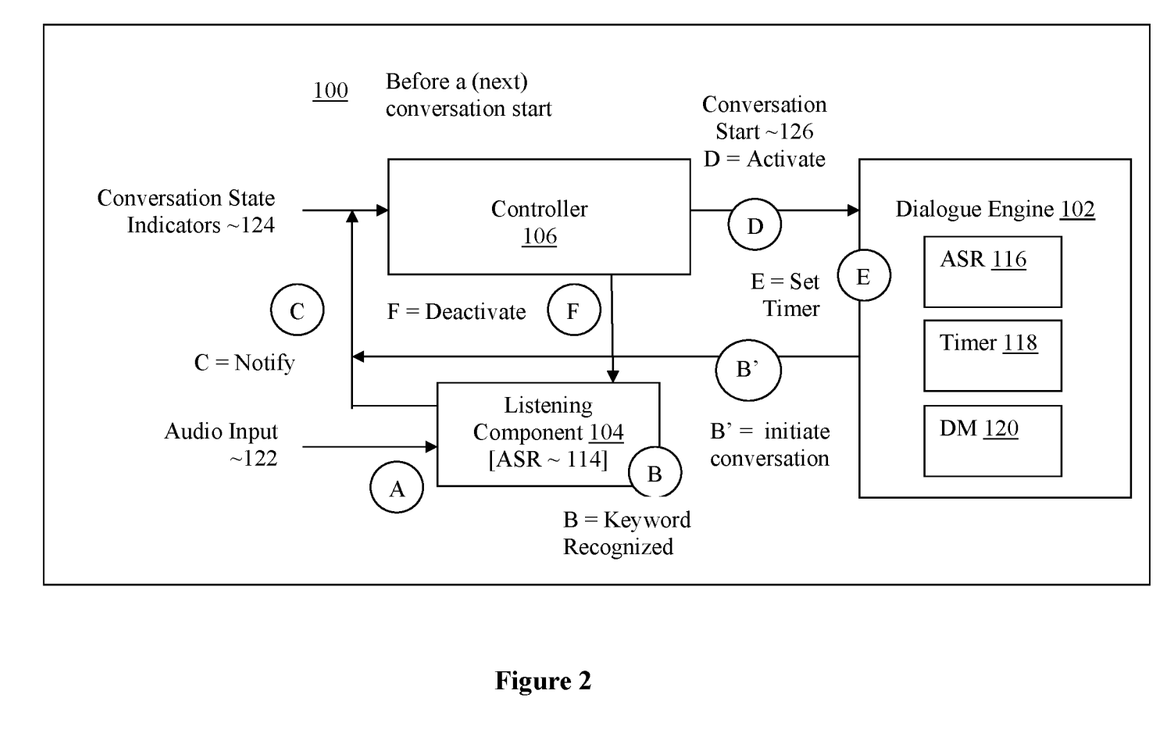
FIG. 2 is a simplified block diagram of the spoken dialogue system, including interactions of its components prior to the start of a conversation, in accordance with various embodiments.

Referring now to FIG. 2, wherein a simplified block diagram of the spoken dialogue engine, including interactions of its components prior to the start of a conversation, in accordance with various embodiments, is illustrated. As shown, at stage A, prior to the start of a conversation (e.g., after the end of a prior conversation), ASR 114 of listening component 104 may receive and process audio input 122, and listen for the keyword(s)/phase(s). Next, at stage B, a keyword/phrase may be recognized by ASR 114.

Then, at stage C, listening component 104 may notify controller 106 of the detection of the keyword/phrase. Next, at stage D, on receipt of the notification, controller 106 may reason or infer the start or beginning 126 of a new conversation between system 100 and a user. Controller 106 may activate or cause dialogue engine 102 to be activated or reactivated from a deactivated state. In embodiments, controller 106 may transmit an activation signal to dialogue engine 102 to cause dialogue engine 102 to return to an active state from a deep sleep or suspended state that substantially consume very little or virtually no power. In other embodiments, controller 106 may send a signal to a power unit or a switch to cause power to be supplied to dialogue engine 102 to exit from a power-off state to enter a power-on state.

In embodiments, on activation/re-activation, dialogue engine 102 may be given control. In addition to begin conversing with a user, dialogue engine 102 may set timer 118 to expire after a time period. The length of the time period may be application dependent, and in embodiments, may be configurable for different applications.

At stage F, controller 106 may revoke control from listening component 104, deactivate or cause listening component 104 to be deactivated. In embodiments, controller 106 may transmit an deactivation signal to listening component 104 to cause listening component 104 to return to an inactive state or a deep sleep or suspended state that substantially consume very little or virtually no power. In other embodiments, controller 106 may send a signal to a power unit or a switch to cause cessation of power being supplied to listening component 104 to place listening component 104 in a power-off state. In alternative embodiments, listening component 104 may automatically relinquish control, and place itself in a sleep state or power itself off on notifying controller 106 of the detection of a keyword/phrase.

In embodiments, in addition to the above described flow for starting a conversation, dialogue engine (DE) 102 may also initiate a conversation with the user. In these embodiments, at stage A, while listening component 104 listening for the keyword, dialogue engine 102, in response to any one of a number of host system events may wake up or activate on its own, and initiate a conversation with the user. To initiate the conversation, dialogue engine 102 may send a notification to controller 106 informing its desire to engage the user in a conversation (similar to listening component 104 sending a notification to controller 106, when listening component 104 detects the keyword in audio input 122). On receipt of the notification from dialogue engine 102, controller 106 may proceed and start the conversation substantially as before. Controller 106 may transfer control to dialogue engine 102, including instruction to set timer 118, and deactivate listening component 104, as earlier described. Since dialogue engine 102 has already been activated, for this scenario, controller 106 may skip waking up or activating dialogue engine 102.

Figure 3:
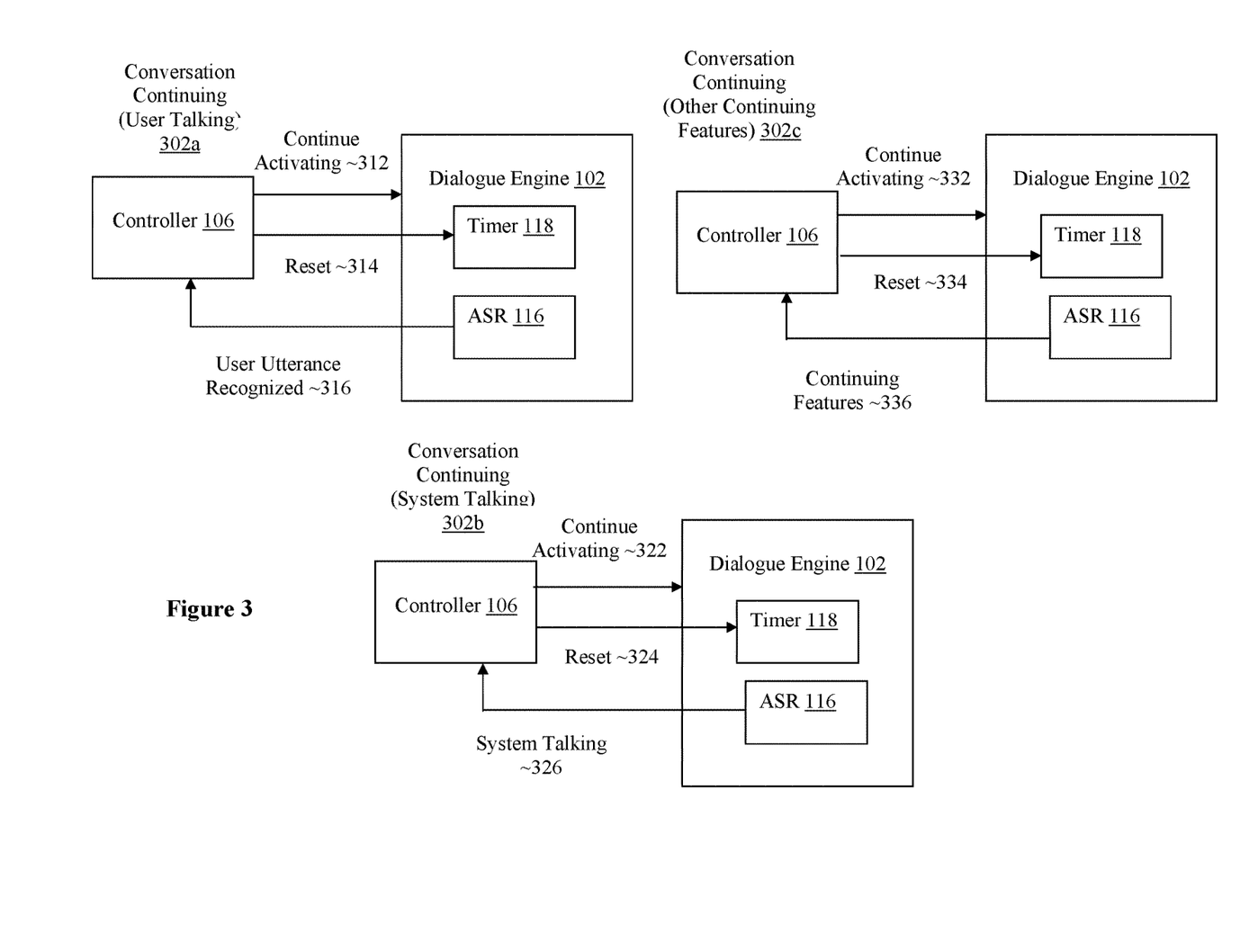
FIG. 3 illustrates is a simplified block diagram of the spoken dialogue system, including interactions of its components during a conversation, in accordance with various embodiments.

Referring now to FIG. 3, wherein a simplified block diagram of the spoken dialogue system, including interactions of its components during a conversation, in accordance with various embodiments, is illustrated. Shown in FIG. 3 are the components and their interactions under three separate scenarios, scenario 302a where the conversation continues as a result of user utterances 316, scenario 302b where the conversation continues as a result of system talking 326 to respond to user utterances, and scenario 302c where features 336 that tend to indicate continuing conversation were detected (e.g., rising or flat pitch, pitch range being maintained, filled pauses, or system responses that tend to elicit further user utterances).

Under scenario 302a, on recognition of user utterances 316, dialogue engine 102 (e.g., ASR 116) may notify controller 106 of such recognition. In response, controller 106 may allow dialogue engine 102 to retain control, reset or cause to be reset 314 timer 118 to the beginning of the time period. In embodiments, controller 106 may further continue to maintain 312 an activation signal that denotes dialogue engine 102 is to remain activated.

Under scenario 302b, on commencing response to user utterances (system talking) 326, dialogue engine 102 (e.g., ASR 116) may notify controller 106 of such commencement. In response, controller 106 may similarly allow dialogue engine 102 to retain control, reset or cause to be reset 324 timer 118 to the beginning of the time period. In embodiments, controller 106 may similarly further continue to maintain 322 an activation signal that denotes dialogue engine 102 is to remain activated.

Under scenario 302c, on recognition of continuing features 336, dialogue engine 102 (e.g., ASR 116) may notify controller 106 of such recognition. In response, controller 106 may allow dialogue engine to retain control, reset or cause to be reset 334 timer 118 to the beginning of the time period. In embodiments, controller 106 may further continue to maintain 332 an activation signal that denotes dialogue engine 102 is to remain activated.

Figure 4:
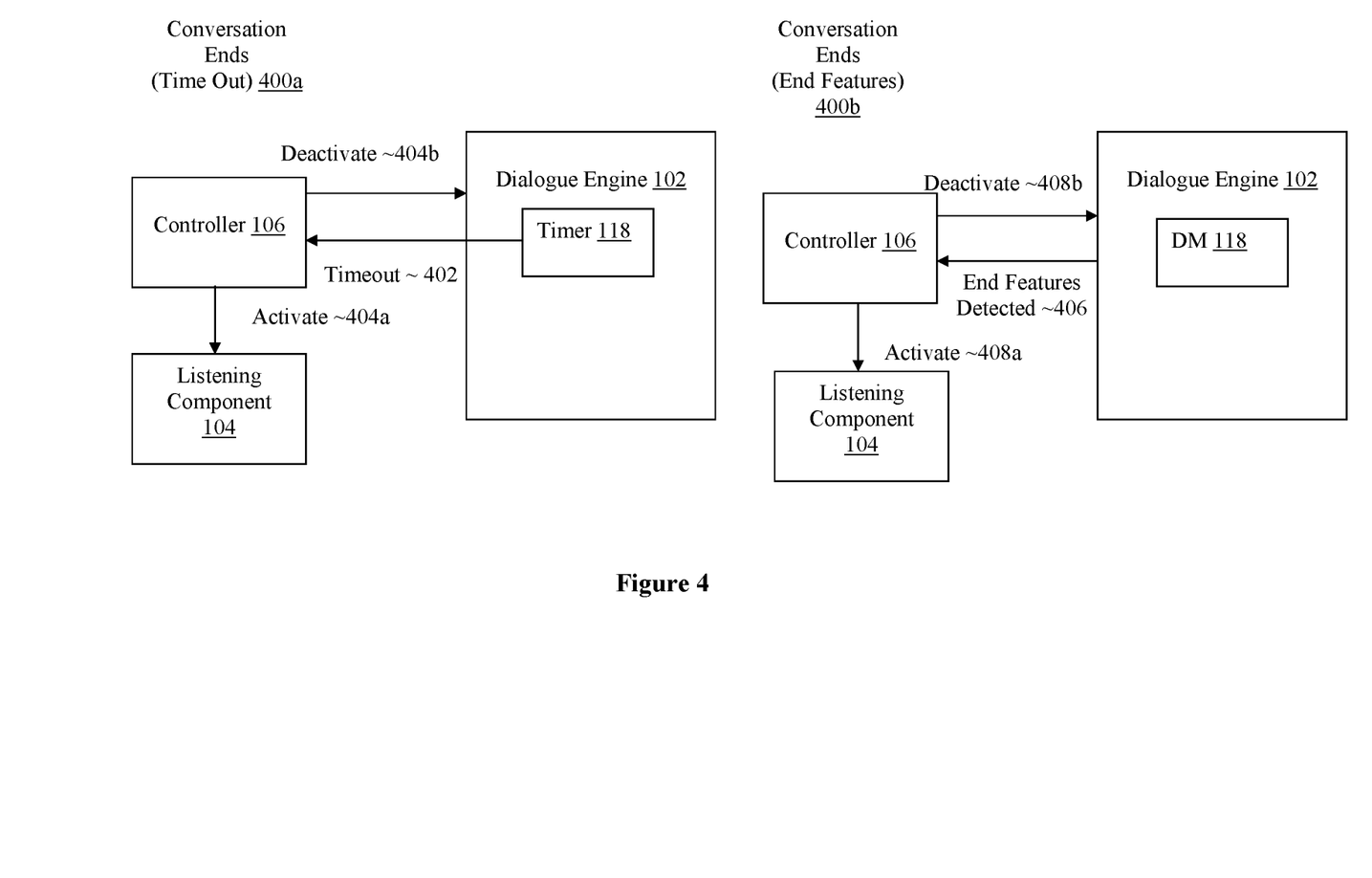
FIG. 4 illustrates is a simplified block diagram of the spoken dialogue system, including interactions of its components at an end of a conversation, in accordance with various embodiments.

Referring now to FIG. 4, wherein a simplified block diagram of the spoken dialogue system, including interactions of its components at an end of a conversation, in accordance with various embodiments, is illustrated. Shown in FIG. 4 are the components and their interactions under two separate scenarios, scenario 400a where the conversation ends as a result of a time out of timer 118 (prolonged silence), and scenario 400b where end of features were detected (e.g., falling pitch, pitch range not being maintained, extended pauses, or system responses that tend to not elicit further user utterances).

Under scenario 400a, on expiration/timeout 402 of timer 118, dialogue engine 102 (e.g., timer 118) may notify controller 106 of such timeout event. In response, controller 106 may activate or cause to be activated 404a listening component 104 to return to an active state from an inactive state, and transfer control to listening component 104 to listen for keywords/phrases again. In embodiments, controller 106 may further revoke control from dialogue engine 102, deactivate or cause to be deactivated 404b dialogue engine 102 to place dialogue engine 102 in a low power or power-off state.

Under scenario 400b, on detection of end of conversation features 406, dialogue engine 102 (e.g., dialogue manager 118) may notify controller 106 of such detection. In response, controller 106 may activate or cause to be activated 408a listening component 104 to return to an active state from an inactive state, and transfer control to listening component 104 to listen for keywords/phrases again. In embodiments, controller 106 may further revoke control from dialogue engine 102, deactivate or cause to be deactivated 408b dialogue engine 102 to place dialogue engine 102 in a low power or power-off state.

Figure 5:
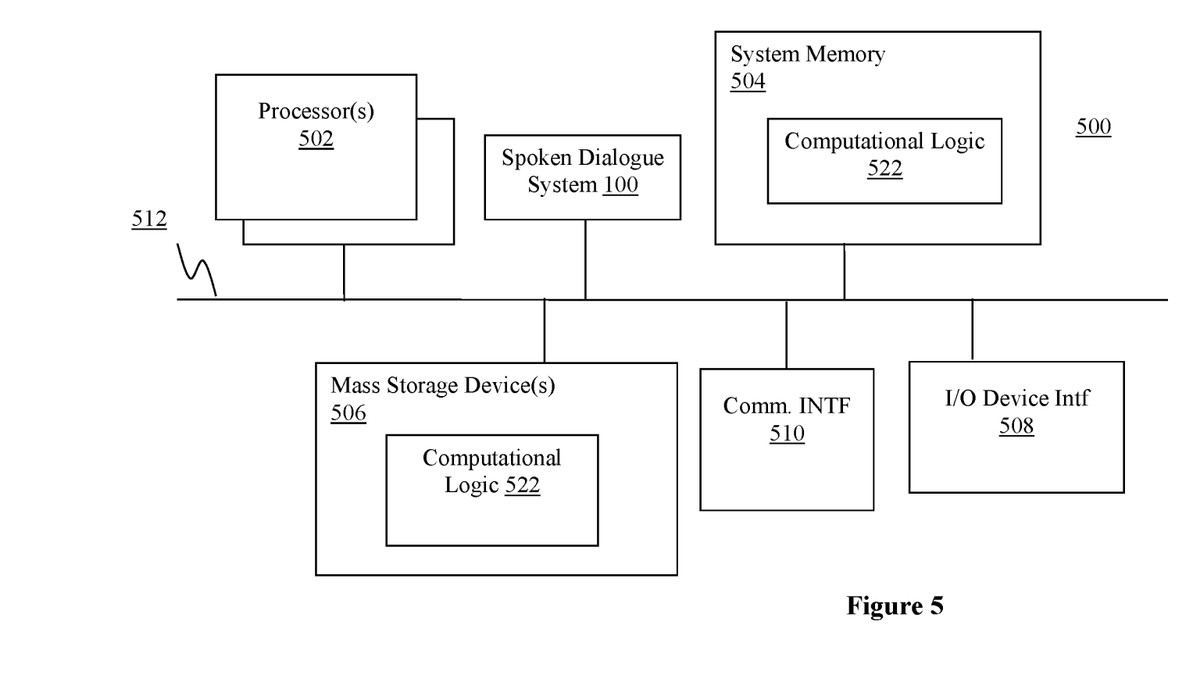
FIG. 5 illustrates a computing system suitable for practicing aspects of the present disclosure, in accordance with various embodiments.

Referring now to FIG. 5, wherein a block diagram of a computer device suitable for practicing the present disclosure, in accordance with various embodiments, is illustrated. As shown, computer device 500 may include one or more processors 502, system memory 504, and spoken dialogue system 100. Each processor 502 may include one or more processor cores. System memory 504 may include any known volatile or non-volatile memory. Spoken dialogue system 100 may include dialogue engine 102, listening component 104 and controller 106, as earlier described.

Additionally, computer device 500 may include mass storage device(s) 506 (such as solid state drives), input/output device interface 508 (to interface with various input/output devices, such as, mouse, cursor control, display device (including touch sensitive screen), and so forth) and communication interfaces 510 (such as network interface cards, modems and so forth). In embodiments, communication interfaces 510 may support wired or wireless communication, including near field communication. The elements may be coupled to each other via system bus 512, which may represent one or more buses. In the case of multiple buses, they may be bridged by one or more bus bridges (not shown).

Each of these elements may perform its conventional functions known in the art. In particular, system memory 504 and mass storage device(s) 506 may be employed to store a working copy and a permanent copy of the executable code of the programming instructions of an operating system and one or more application collectively referred to as computing logic 522. In embodiments, one or more component of the operating system or an application may be configured to practice (aspects of) of spoken dialogue system 100, e.g., the timer function, or some ASR functions, and so forth. The programming instructions may comprise assembler instructions supported by processor(s) 502 or high-level languages, such as, for example, C, that can be compiled into such instructions.

The permanent copy of the executable code of the programming instructions may be placed into permanent mass storage device(s) 506 in the factory, or in the field, through, for example, a distribution medium (not shown), such as a compact disc (CD), or through communication interface 510 (from a distribution server (not shown)).

The number, capability and/or capacity of these elements 510-512 may vary, depending on the intended use of example computer device 500, e.g., whether example computer device 500 is a wearable device, a personal digital assistant, a smartphone, tablet, ultrabook, a laptop, a server, a vehicle infotainment system, a set-top box, a game console, a camera, and so forth. The constitutions of these elements 510-512 are otherwise known, and accordingly will not be further described.

Figure 6:
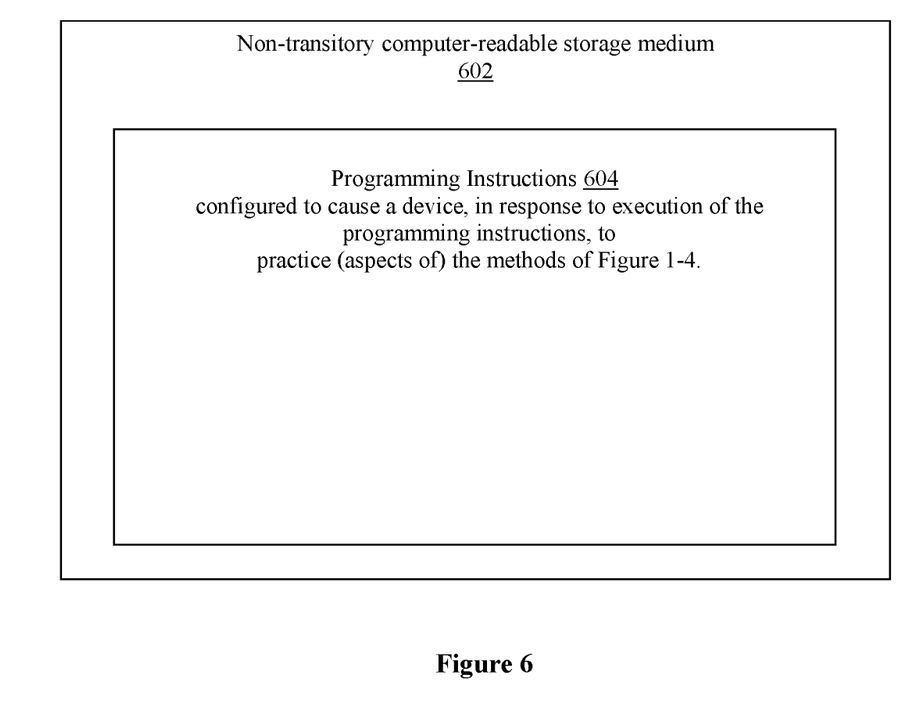
FIG. 6 illustrates an example computer-readable storage medium having instructions configured to practice (aspects of) the methods illustrated in FIGS. 1-4, in accordance with various embodiments.

FIG. 6 illustrates an example computer-readable storage medium having instructions configured to practice (aspects of) the methods of FIGS. 1-4, earlier described, in accordance with various embodiments. As illustrated, computer-readable storage medium 602 may include the executable code of a number of programming instructions 604. Executable code of programming instructions 604 may be configured to enable a device, e.g., spoken dialogue system 100 or computer device 500, in response to execution of the executable code/programming instructions, to perform (aspects of) the methods of FIG. 1-4. In alternate embodiments, executable code/programming instructions 604 may be disposed on multiple non-transitory computer-readable storage medium 602 instead. In embodiments, computer-readable storage medium 602 may be non-transitory. In still other embodiments, executable code/programming instructions 604 may be encoded in transitory computer readable medium, such as signals.

Referring back to FIG. 1, for one embodiment, controller 106 may be packaged together with a computer-readable storage medium having executable code of some or all of instructions 604 configured to practice all or selected ones of the operations of controller 106 earlier described with references to FIGS. 1-4. For one embodiment, controller 106 may be packaged together with a computer-readable storage medium having executable code of some or all of instructions 604 to form a System in Package (SiP). For one embodiment, controller 106 may be integrated on the same die with a computer-readable storage medium having executable code of some or all of instructions 604. For one embodiment, controller 106 may be packaged together with a computer-readable storage medium having some or all of instructions 604 to form a System on Chip (SoC). For at least one embodiment, the SoC may be utilized in, e.g., but not limited to, a voice based portable personal assistant.

Example 1 may be an apparatus for natural machine conversing with a user, comprising: a listening component to detect a keyword that denotes start of a conversation; a dialogue engine to converse with the user during the conversation; and a controller coupled to the listening component and the dialogue engine to selectively activate or cause to be activated one of the listening component or the dialogue component, and to pass control to the activated listening component or the activated dialogue engine, based at least in part on a state of the conversation.

Example 2 may be example 1, wherein the listening component during operation consumes less power than power consumed by the dialogue engine during its operation.

Example 3 may be example 1, wherein the listening component may send the controller a conversation state indicator that denotes a detection of the keyword or the start of the conversation, or the dialogue engine may send the controller a conversation state indicator that denotes a desire to start the conversation.

Example 4 may be example 3, wherein the controller may activate or cause to be activated the dialogue engine, and to pass control to the dialogue engine, on receipt of the conversation state indicator that denotes a detection of the keyword or the start of the conversation, or the conversation state indicator that denotes a desire of the dialogue engine to start the conversation.

Example 5 may be example 4, wherein the controller may further deactivate or cause to be deactivated the listening component, on receipt of the conversation state indicator that denotes a detection of the keyword or the start of the conversation, or on receipt of the conversation state indicator that denotes a desire to start the conversation.

Example 6 may be example 4, wherein the dialogue engine, on activation, may set a timer, to recognize user utterance, and to respond to the user utterance.

Example 7 may be example 6, wherein the controller may reset or cause the timer to be reset on receipt of a conversation state indicator that indicates continuation of the conversation.

Example 8 may be example 7, wherein the dialogue engine may send, and the controller may receive from the dialogue engine, a conversation state indicator that denotes the dialogue engine recognized user utterance, the dialogue engine responded to user utterance, or the dialogue engine detected continuing conversation features.

Example 9 may be example 6, wherein the controller may activate or cause to be activated the listening component, and to pass control to the listening component, on receipt of a conversation state indicator that denotes the state of the conversation is at an end state or an expiration of the timer.

Example 9 may be example 5, wherein the dialogue engine may further detect for end of conversation features, and wherein the controller may activate the listening component, and to pass control to the listening component, on receipt from the dialogue engine a conversation state indicator that denotes a detection of end of conversation features.

Example 11 may be any one of examples 1-10, wherein the controller may activate the listening component, and to pass control to the listening component, on receipt of a conversation state indicator that denotes a detection of an end of the conversation.

Example 12 may be a machine implemented method for natural conversing with a user, comprising: setting, by a dialogue engine of a computer device, a timer of the dialogue engine, on activation of the dialogue engine; on setting the timer, conversing, by the dialogue engine, with a user of the computer device; and on expiration of the timer, notifying a controller of the computer device, by the dialogue engine, of the expiration of the timer.

Example 13 may be example 12, further comprising sending to the controller, by a listening component of the computer device, a conversation state indicator that denotes a detection of a keyword or a start of conversing with the user, or sending to the controller, by the dialogue engine, a conversation state indicator that denotes a desire to start conversing with the user.

Example 14 may be example 13, further comprising activating or causing to be activated, by the controller, the dialogue engine, and passing control to the dialogue engine, on receipt of the conversation state indicator that denotes a detection of the keyword or the start of the conversing with the user, or the conversation state indicator that denotes a desire of the dialogue engine to start conversing with the user.

Example 15 may be example 14, further comprising deactivating or causing to be deactivated, by the controller, the listening component, on receipt of the conversation state indicator that denotes a detection of the keyword or the start of the conversing with the user, or on receipt of the conversation state indicator that denotes a desire to start conversing with the user.

Example 16 may be example 14, further comprising, setting, by the dialogue engine, on activation, a timer; recognizing, by the dialogue engine, user utterance, and responding, by the dialogue engine, to the user utterance.

Example 17 may be example 16, further comprising resetting or causing to be reset, by the controller, the timer, on receipt of a conversation state indicator that indicates continuation of the conversation.

Example 18 may be example 17, further comprising sending, by the dialogue engine, to the controller, a conversation state indicator that denotes the dialogue engine recognized user utterance, the dialogue engine responded to user utterance, or the dialogue engine detected continuing conversation features.

Example 19 may be example 16, further comprising activating or causing to be activated, by the controller, the listening component, and passing control to the listening component, on receipt of a conversation state indicator that denotes the state of the conversation is at an end state or an expiration of the timer.

Example 20 may be example 15, further comprising detecting, by the dialogue engine, for end of conversation features, and activating, by the controller, the listening component, and passing control to the listening component, on receipt from the dialogue engine a conversation state indicator that denotes a detection of end of conversation features.

Example 21 may be any one of examples 12-18, further comprising activating, by the controller, the listening component, and passing control to the listening component, on receipt of a conversation state indicator that denotes a detection of an end of the conversation.

Example 22 may be one or more computer-readable medium (CRM) having instructions to cause a computer device, in response to the execution of the instructions, to: analyze, with a controller of the computer device, indicators that denote states of a conversation between the computer device and a user; and selectively activate, causing to be activated, with the controller, a selected one of a listening component or a dialogue engine of the computer device, based at least in part on the state of the conversation with the user, and pass control to the activated listening component to detect for a keyword that denotes start of a conversation, or a dialogue engine to converse with the user.

Example 23 may be example 22, wherein the computer device may be further caused to send, with the listening component, to the controller a conversation state indicator that denotes a detection of the keyword or the start of the conversation, or the dialogue engine may send the controller a conversation state indicator that denotes a desire to start the conversation.

Example 24 may be example 23, wherein the computer device may be further caused, with the controller, to activate the dialogue engine, and to pass control to the dialogue engine, on receipt of the conversation state indicator that denotes a detection of the keyword or the start of the conversation, or the conversation state indicator that denotes a desire of the dialogue engine to start the conversation.

Example 25 may be example 24, wherein the computer device may be further caused, with the controller to deactivate the listening component, on receipt of the conversation state indicator that denotes a detection of the keyword or the start of the conversation, or on receipt of the conversation state indicator that denotes a desire to start the conversation.

Example 26 may be example 24, wherein the computer device may be further caused, with the dialogue engine, on activation, to set a timer, to recognize user utterance, and to respond to the user utterance.

Example 27 may be example 26, wherein the computer device may be further caused, with the controller, to reset the timer, on receipt of a conversation state indicator that indicates continuation of the conversation.

Example 28 may be example 27, wherein the computer device may be further caused, with the dialogue engine, to send to the controller, a conversation state indicator that denotes the dialogue engine recognized user utterance, the dialogue engine responded to user utterance, or the dialogue engine detected continuing conversation features.

Example 29 may be example 26, wherein the computer device may be further caused, with the controller, to activate the listening component, and to pass control to the listening component, on receipt of a conversation state indicator that denotes the state of the conversation is at an end state or an expiration of the timer.

Example 30 may be example 25, wherein the computer device may be further caused, with the dialogue engine, to detect for end of conversation features, and wherein the controller may activate the listening component, and to pass control to the listening component, on receipt from the dialogue engine a conversation state indicator that denotes a detection of end of conversation features.

Example 31 may be any one of examples 22-28, wherein the computer device may be further caused, with the controller, to activate the listening component, and to pass control to the listening component, on receipt of a conversation state indicator that denotes a detection of an end of the conversation.

Example 32 may be an apparatus for natural machine conversing with a user, comprising: conversing means for conversing with a user of the apparatus; wherein the conversing means includes timer setting means for setting a timer duration, on activation of the means for conversing with the user; and controller means, external to the means for conversing, to cause the timer means to reset the timer to a beginning of the timer duration, prior to expiration of the timer duration, whenever the controller means receives an indicator that denotes continuation of the conversing with the user.

Example 33 may be example 32, further comprising listening means for sending to the controller means, a conversation state indicator that denotes a detection of a keyword or a start of conversing with the user, or sending to the controller, by the dialogue engine, a conversation state indicator that denotes a desire to start conversing with the user.

Example 34 may be example 33, wherein the controller means may further comprise means for activating or causing to be activated, the conversing means, and passing control to the conversing means, on receipt of the conversation state indicator that denotes a detection of the keyword or the start of the conversing with the user, or the conversation state indicator that denotes a desire of the dialogue engine to start conversing with the user.

Example 35 may be example 34, wherein the controller means may further comprise means for deactivating or causing to be deactivated the listening means, on receipt of the conversation state indicator that denotes a detection of the keyword or the start of the conversing with the user, or on receipt of the conversation state indicator that denotes a desire to start conversing with the user.

Example 36 may be example 34, wherein the conversing means may further comprise means for recognizing, on activation of the timer, user utterance, and means for responding to the user utterance.

Example 37 may be example 36, wherein the controller means may further comprise means for causing the timer to be reset, on receipt of a conversation state indicator that indicates continuation of the conversation.

Example 38 may be example 37, wherein the conversing means may further comprise means for sending to the controller means, a conversation state indicator that denotes the conversing means recognized user utterance, the conversing means responded to user utterance, or the conversing means detected continuing conversation features.

Example 39 may be example 36, wherein the controller means may further comprise means for activating or causing to be activated, the listening means, and passing control to the listening means, on receipt of a conversation state indicator that denotes the state of the conversation is at an end state or an expiration of the timer.

Example 40 may be example 35, wherein the conversing means may further comprise means for detecting for end of conversation features, and the controller means comprises means for activating the listening means, and passing control to the listening means, on receipt from the conversing means a conversation state indicator that denotes a detection of end of conversation features.

Example 41 may be any one of examples 33-40, wherein the controlling means may further comprise means for activating or causing to be activated, the listening means, and passing control to the listening means, on receipt of a conversation state indicator that denotes a detection of an end of the conversation.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. An apparatus for natural machine conversing with a user, comprising:
   listening circuitry, including a first autonomous speech recognition (ASR) engine, to detect a keyword that denotes start of a conversation between the apparatus and the user;
   dialogue circuitry, including a second ASR engine with greater speech recognition capability than the first ASR engine, to converse with the user during the conversation, including to detect for one or more conversation continuing features during the conversation, the one or more conversation continuing features include at least selected pitch attributes of the user; and
   a controller coupled to the listening circuitry and the dialogue circuitry to selectively activate or cause to be activated one of the listening circuitry or the dialogue circuitry, and to pass control to the activated listening component circuitry or the activated dialogue circuitry, based at least in part on a current state of the conversation, which includes at least a start state, a continuing state, and an end state;
wherein the dialogue circuitry is to further notify the controller of the continuing state, on detection of at least one conversation continuing feature to keep the dialogue circuitry from being prematurely deactivated prior to end of the conversation with the user;
wherein detection for conversation continuing features include detection for at least selected pitch attributes of the user.

2. The apparatus of claim 1, wherein the listening circuitry during operation consumes less power than power consumed by the dialogue circuitry during its operation.

3. The apparatus of claim 1, wherein the listening circuitry is to send the controller a conversation state indicator that denotes a detection of the keyword or the start of the conversation, or the dialogue circuitry is to send the controller a conversation state indicator that denotes a desire to start the conversation.

4. The apparatus of claim 3, wherein the controller is to activate or cause to be activated the dialogue circuitry, and to pass control to the dialogue circuitry, on receipt of the conversation state indicator that denotes a detection of the keyword or the start of the conversation, or the conversation state indicator that denotes a desire of the dialogue circuitry to start the conversation.

5. The apparatus of claim 4, wherein the controller is to further deactivate or cause to be deactivated the listening circuitry, on receipt of the conversation state indicator that denotes a detection of the keyword or the start of the conversation, or on receipt of the conversation state indicator that denotes a desire to start the conversation.

6. The apparatus of claim 5, wherein the dialogue circuitry is to further detect for end of conversation features, and wherein the controller is to activate the listening circuitry, and to pass control to the listening circuitry, on receipt from the dialogue circuitry a conversation state indicator that denotes a detection of end of conversation features.

7. The apparatus of claim 4, wherein the dialogue circuitry, on activation, is to set a timer, to recognize user utterance, and to respond to the user utterance.

8. The apparatus of claim 7, wherein the controller is to reset or cause the timer to be reset on receipt of a conversation state indicator that indicates continuation of the conversation.

9. The apparatus of claim 8, wherein the dialogue circuitry is to send, and the controller is to receive from the dialogue circuitry, a conversation state indicator that denotes the dialogue circuitry recognized user utterance, the dialogue circuitry responded to user utterance, or the dialogue circuitry detected one or more of the continuing conversation features.

10. The apparatus of claim 7, wherein the controller is to activate or cause to be activated the listening circuitry, and to pass control to the listening circuitry, on receipt of a conversation state indicator that denotes the state of the conversation is at the end state or an expiration of the timer.

11. The apparatus of claim 1, wherein the controller is to activate the listening circuitry, and to pass control to the listening circuitry, on receipt of a conversation state indicator that denotes a detection of an end of the conversation.

12. A machine implemented method for natural conversing with a user, comprising:
setting, by dialogue circuitry of a computer device, a timer of the dialogue circuitry, on activation of the dialogue circuitry, the dialogue circuitry further including a first automatic speech recognition (ASR) engine;
on setting the timer, conversing, by the dialogue circuitry, with a user of the computer device; and
on expiration of the timer, notifying a controller of the computer device, by the dialogue circuitry, of the expiration of the timer;
wherein on notification of the expiration of the timer, the dialogue circuitry is de-activated, and a listening circuitry of the computer device is activated instead, the listening circuitry having a second ASR engine with lesser speech recognition capability than the first ASR engine;
wherein the method further comprises:
detecting, by the dialogue circuitry, for one or more conversation continuing features during the conversing, the one or more conversation continuing features include at least selected pitch attributes of the user;
on detection of at least one conversation continuing feature, notifying the controller, by the dialogue circuitry, of the detection; and
on notification of the detection, resetting the timer to keep the dialogue circuitry from being prematurely deactivated prior to end of conversing with the user.

13. The method of claim 12, further comprising sending to the controller, by a listening circuitry of the computer device, a conversation state indicator that denotes a detection of a keyword or a start of conversing with the user, or sending to the controller, by the dialogue circuitry, a conversation state indicator that denotes a desire to start conversing with the user.

14. The method of claim 13, further comprising activating or causing to be activated, by the controller, the dialogue circuitry, and passing control to the dialogue circuitry, on receipt of the conversation state indicator that denotes a detection of the keyword or the start of the conversing with the user, or the conversation state indicator that denotes a desire of the dialogue circuitry to start conversing with the user.

15. The method of claim 14, further comprising deactivating or causing to be deactivated, by the controller, the listening circuitry, on receipt of the conversation state indicator that denotes a detection of the keyword or the start of the conversing with the user, or on receipt of the conversation state indicator that denotes a desire to start conversing with the user.

16. The method of claim 15, further comprising activating or causing to be activated, by the controller, the listening circuitry, and passing control to the listening circuitry, on receipt of a conversation state indicator that denotes the state of the conversation is at an end state or an expiration of the timer.

17. The methods of claim 15, further comprising detecting, by the dialogue circuitry, for end of conversation features, and activating, by the controller, the listening circuitry, and passing control to the listening circuitry, on receipt from the dialogue circuitry a conversation state indicator that denotes a detection of end of conversation features.

18. The method of claim 12, further comprising activating, by the controller, the listening circuitry, and passing control to the listening circuitry, on receipt of a conversation state indicator that denotes a detection of an end of the conversation.

19. One or more non-transitory computer-readable medium (CRM) having instructions to cause a computer device, in response to the execution of the instructions, to:

analyze, with a controller of the computer device, indicators that denote states of a conversation between the computer device and a user, the states including a start conversation state, a conversation continuing state, and an end conversation state; and selectively activate, causing to be activated, with the controller, a selected one of a listening circuitry or a dialogue circuitry of the computer device, based at least in part on the state of the conversation with the user, and pass control to the activated listening circuitry to detect for a keyword that denotes start of a conversation, or a dialogue circuitry to converse with the user, the listening circuitry including a first autonomous speech recognition (ASR) engine, and the dialogue circuitry including a second ASR engine with greater speech recognition capability than the first ASR engine; wherein the dialogue circuitry, while conversing with the user, further detects for continuing conversation features that include at least selected pitch attributes of the user, and on detection of one or more continuing conversation features, notifies the controller of the detection to prevent the dialogue circuitry from being prematurely deactivated prior to an end of the conversation.

20. The CRM of claim 19, wherein the computer device is further caused to send, with the listening circuitry, to the controller a conversation state indicator that denotes a detection of the keyword or the start of the conversation, or the dialogue circuitry is to send the controller a conversation state indicator that denotes a desire to start the conversation.

21. The CRM of claim 20, wherein the computer device is further caused, with the controller, to activate the dialogue circuitry, and to pass control to the dialogue circuitry, on receipt of the conversation state indicator that denotes a detection of the keyword or the start of the conversation, or the conversation state indicator that denotes a desire of the dialogue circuitry to start the conversation.

22. The CRM of claim 21, wherein the computer device is further caused, with the controller to deactivate the listening circuitry, on receipt of the conversation state indicator that denotes a detection of the keyword or the start of the conversation, or on receipt of the conversation state indicator that denotes a desire to start the conversation.

23. The CRM of claim 21, wherein the computer device is further caused, with the dialogue circuitry, on activation, to set a timer, to recognize user utterance, and to respond to the user utterance.

24. The CRM of claim 23, wherein the computer device is further caused, with the controller, to reset the timer, on receipt of a conversation state indicator that indicates continuation of the conversation.

25. The CRM of claim 24, wherein the computer device is further caused, with the dialogue circuitry, to send to the controller a conversation state indicator that denotes the dialogue circuitry recognized user utterance, the dialogue circuitry responded to user utterance, or the dialogue circuitry detected continuing conversation features.

* * * * *